(12) United States Patent
Gass et al.

(10) Patent No.: US 8,116,056 B2
(45) Date of Patent: Feb. 14, 2012

(54) LOW VOLTAGE STARTUP TIMER FOR A MICROCONTROLLER-BASED CIRCUIT BREAKER

(75) Inventors: Randy Gass, Cedar Rapids, IA (US); Issa Drame, Cedar Rapids, IA (US)

(73) Assignee: Schneider Electric USA, Inc., Palatine, IL (US)

( * ) Notice: Subject to any disclaimer, the term of this patent is extended or adjusted under 35 U.S.C. 154(b) by 621 days.

(21) Appl. No.: 12/270,997

(22) Filed: Nov. 14, 2008

(65) Prior Publication Data

US 2010/0123990 A1 May 20, 2010

(51) Int. Cl.
*H02H 3/027* (2006.01)
(52) U.S. Cl. ......................................................... 361/98
(58) Field of Classification Search ...................... 361/98
See application file for complete search history.

(56) References Cited

U.S. PATENT DOCUMENTS

| | | | |
|---|---|---|---|
| 4,264,941 A * | 4/1981 | London | 361/91.5 |
| 5,214,560 A * | 5/1993 | Jensen | 361/93.2 |
| 5,825,602 A * | 10/1998 | Tosaka et al. | 361/94 |
| 6,297,940 B1 | 10/2001 | Wu | 361/79 |
| 7,177,129 B2 * | 2/2007 | Arenz et al. | 361/93.1 |
| 7,545,614 B2 * | 6/2009 | Traynor et al. | 361/56 |

FOREIGN PATENT DOCUMENTS

DE 19927030 A1 * 12/2000

* cited by examiner

*Primary Examiner* — Rexford Barnie
*Assistant Examiner* — Ann Hoang

(57) ABSTRACT

A circuit breaker capable of microcontroller-based fault detection having a backup circuit for causing the circuit breaker to trip in response to a microcontroller fault, including a timing circuit powered by a power supply and a microcontroller. The timing circuit is electrically coupled to an SCR that causes the circuit breaker to trip. The timing circuit includes a BJT coupled to the gate of the SCR. The microcontroller has a first output coupled to the timing circuit and a second output coupled to the SCR. The first output is coupled to a node between a resistor and a grounded capacitor in the timing circuit, and the node is coupled to a gate of the SCR and to a base of the transistor. A voltage develops at the node sufficient to cause the gate of the SCR to turn on unless the microcontroller pulls the first high-impedance output to a logic low state.

17 Claims, 3 Drawing Sheets

LOW VOLTAGE STARTUP TIMER FOR A MICROCONTROLLER-BASED CIRCUIT BREAKER

FIELD OF THE INVENTION

Aspects of the present invention relates generally to circuit breakers with microcontroller-based fault detection, and in particular, to a backup tripping function for a circuit breaker with microcontroller-based fault detection.

BACKGROUND OF THE INVENTION

In a circuit breaker with microcontroller-based fault detection, a failure in the power supply regulator circuit or the microcontroller itself can lead to an inability to detect faults on the circuit being protected, leaving the load to which the circuit breaker is connected unprotected and vulnerable. It is desirable to have a circuit breaker deny power to the protected circuit if the circuit breaker does not have the ability to detect faults by tripping as soon after power is applied as possible.

What is needed is a backup circuit that forces a microcontroller-based circuit breaker to trip if the microcontroller does not start up correctly either due to a failure in the regulated power supply or a fault in the microcontroller itself or both. Aspects and embodiments disclosed herein are directed to addressing/solving these and other needs.

SUMMARY OF THE INVENTION

Two different backup timing circuit implementations are described. These backup timing circuits ensure that an electronic circuit breaker will trip even if certain electronics within the circuit breaker are unresponsive. The electronic circuit breaker includes a microcontroller that analyzes current or voltage signals in a circuit and trips the circuit breaker when those signals exceed certain thresholds or criteria. If the microcontroller does not work at startup, the loads being protected by the circuit breaker become vulnerable to certain types of electrical faults. In essence, the microcontroller represents a "warning system" to detect certain types of faults which are not protected by the mechanical thermal or magnetic components within the circuit breaker. The microcontroller is powered by a separate power supply within the circuit breaker, and this power supply derives its power from the current on the line. If the power supply fails, the microcontroller will become unresponsive, so one of the backup timing circuit implementations also bypasses the microcontroller if the power supply fails to operate properly. The backup timing circuits disclosed herein bypass or override the "early warning system" provided by the microcontroller if the microcontroller is unresponsive at startup or because its power supply is unresponsive or both.

In a first implementation, a backup timing circuit is powered by a power supply in a microcontroller-based circuit breaker. The timing circuit includes a transistor whose gate is charged by a node that is also connected to a configurable pin of the microcontroller. When the microcontroller is initially powered on, it runs through various startup and diagnostic routines. During this startup process, the pin is initially in a high impedance state. As a result, the node can build up a voltage across a capacitor that eventually becomes sufficient to energize the transistor. If the microcontroller properly completes its diagnostic and startup routines, then the microcontroller configures the pin to an output and drives it low, shorting out the capacitor of the timing circuit and preventing the transistor from turning on.

In a second implementation, a backup timing circuit is powered directly off of a rectified line voltage. A microcontroller is powered by a separate power supply, but because the timing circuit in this implementation is positioned upstream of the power supply, the timing circuit can react even if the timing circuit is unresponsive. A pin of the microcontroller is connected to a node of the timing circuit, which is also connected to a gate of an electronic switching device that causes the electronic circuit breaker to trip. Upon successful completion of the startup and diagnostic routines, the pin, initially in a high impedance state, is driven low by the microcontroller, shorting out a capacitor of the timing circuit thereby preventing the electronic switching device from turning on. However, if the startup and diagnostic routines fail or if the power supply fails, the pin will remain in a high impedance state, allowing a voltage to build up across the capacitor of the timing circuit, until it is sufficient to energize the electronic switching device.

The foregoing and additional aspects and embodiments of the present invention will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the invention will become apparent upon reading the following detailed description and upon reference to the drawings.

DETAILED DESCRIPTION OF THE ILLUSTRATED EMBODIMENTS

Although the invention will be described in connection with certain aspects and/or embodiments, it will be understood that the invention is not limited to those particular aspects and/or embodiments. On the contrary, the invention is intended to cover all alternatives, modifications, and equivalent arrangements as may be included within the spirit and scope of the invention as defined by the appended claims.

Figure 1:
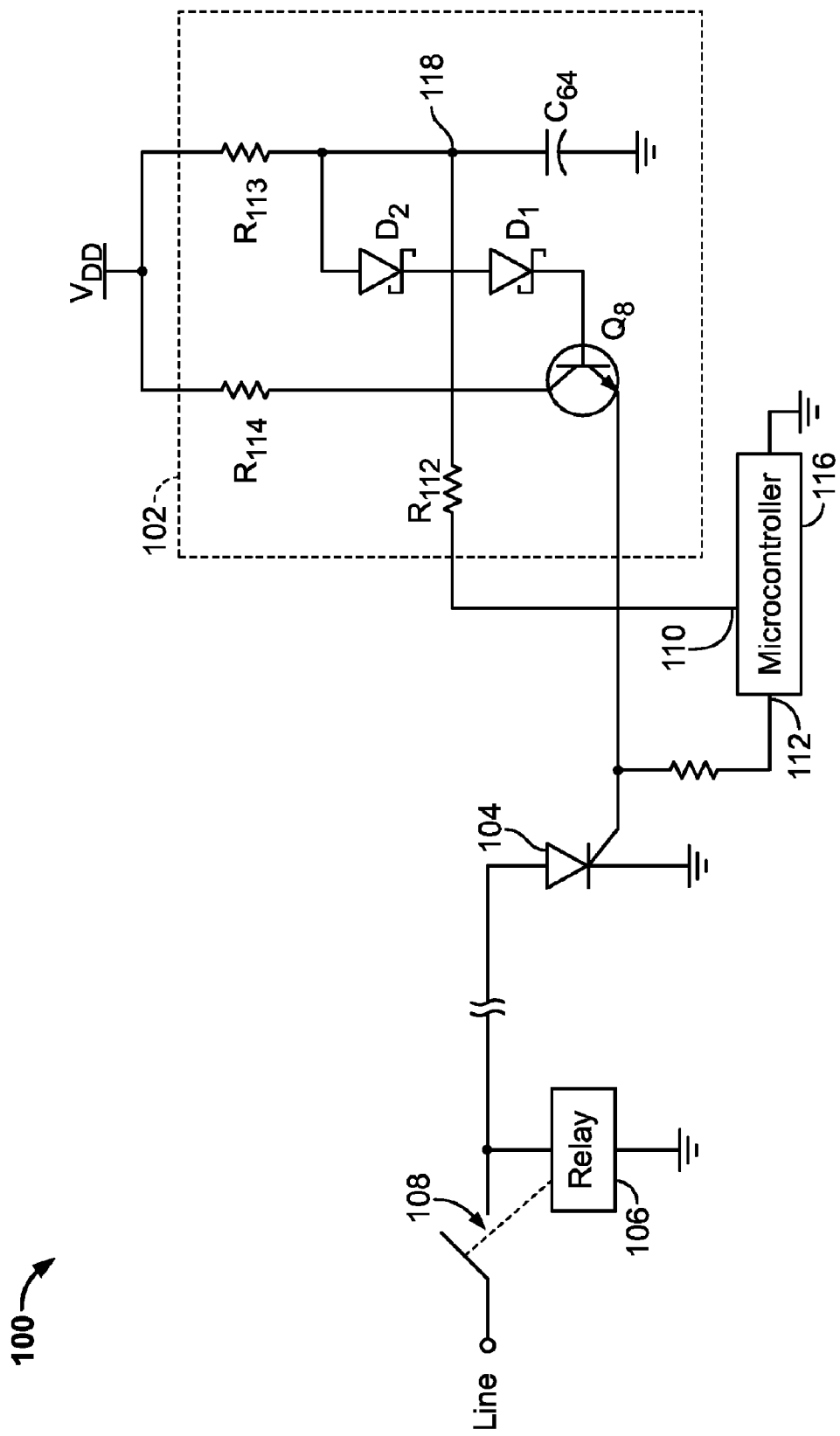
FIG. 1 is a functional block diagram of a microcontroller-based circuit breaker having a backing timing circuit that can trip the circuit breaker if the microcontroller is unresponsive.
Figure 2:
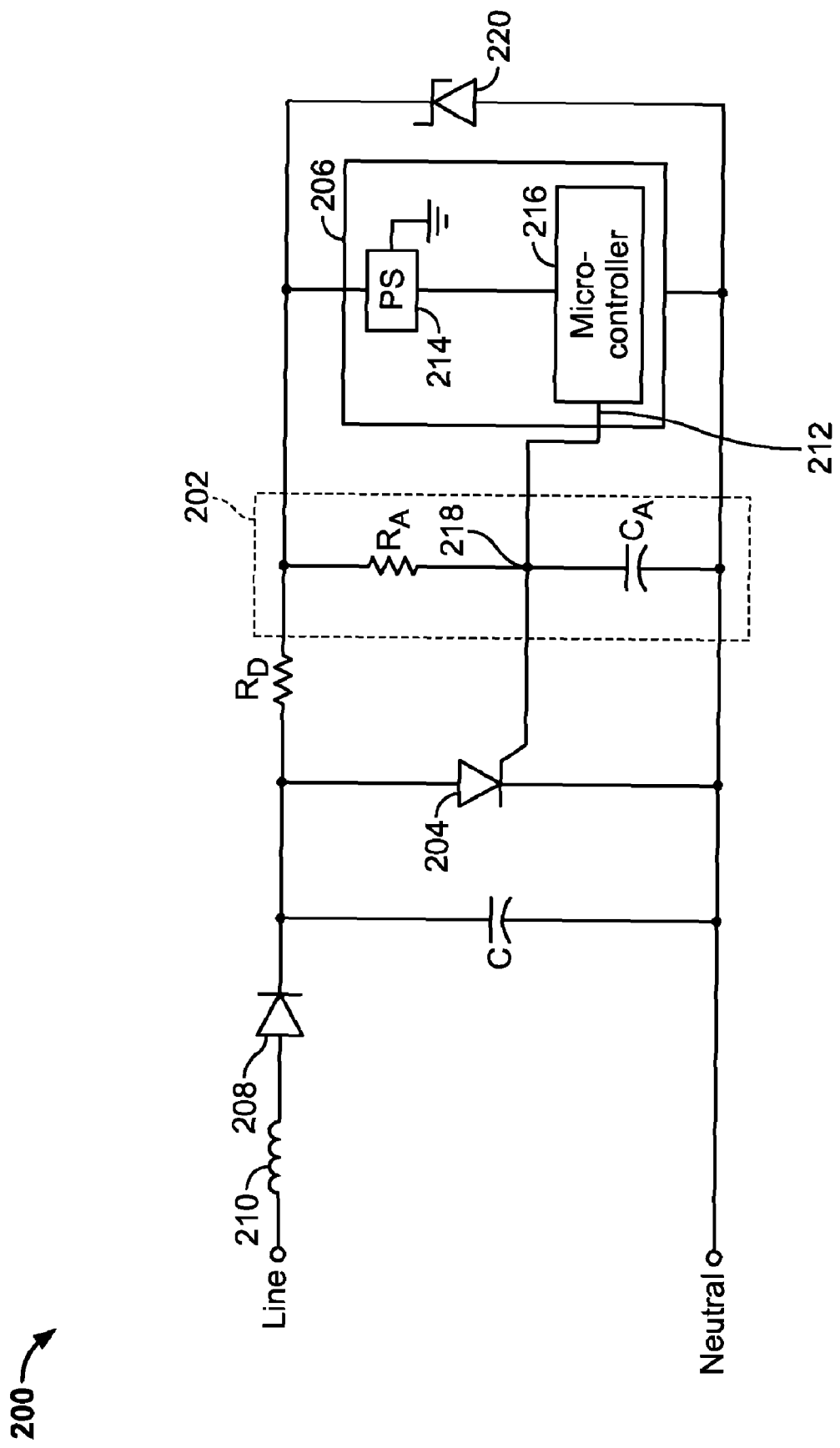
FIG. 2 is a functional block diagram of a microprocessor-based circuit breaker having a timing circuit that can trip the circuit breaker if either the regulated power supply fails or the microcontroller is unresponsive.
Figure 3:
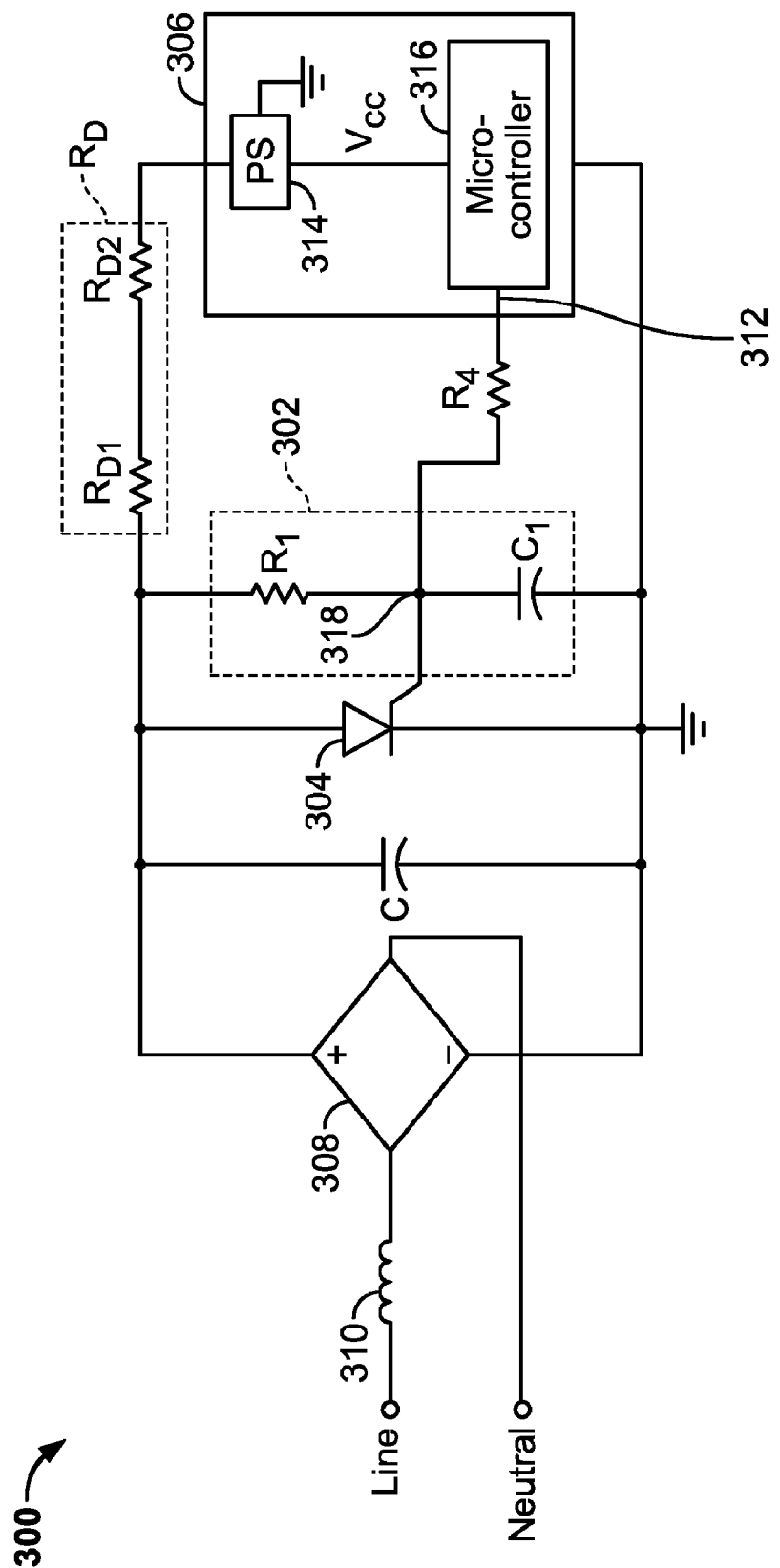
FIG. 3 is a functional block diagram of a circuit breaker similar to that shown in FIG. 2 except that a drop resistor is placed downstream of a timing circuit.

This disclosure describes at least two backup circuits that are used in microcontroller-based circuit breakers for tripping the circuit breaker in the event of a regulated power supply fault or a microprocessor fault. FIG. 1 illustrates a backup circuit that is powered by a regulated power supply and is operable to trip the circuit breaker in the event that the microcontroller is unresponsive at startup. FIGS. 2 and 3 illustrate line-powered backup circuits that are operable to trip the circuit breaker in the event that either the regulated power supply is or becomes unresponsive or the microcontroller is initially unresponsive or both.

FIG. 1 is a functional block diagram of a microcontroller-based circuit breaker 100 conventionally connected to line and neutral (not shown) conductors. The circuit breaker 100 includes movable contacts 108 that are forced apart by a relay 106, solenoid, or other conventional electromechanical tripping device. The circuit breaker 100 includes a timing circuit 102, an electronic switching device 104, and a microcontroller 116 having a first pin 110 and a second pin 112. It should be noted that the terms "first" pin and "second" pin are not intended to imply that these pins correspond to pins 1 and 2, respectively, of the microcontroller 116, but rather are used to differentiate between different pins (e.g., pin X and pin Y). The first pin 110 and the second pin 112 are configurable as high-impedance inputs at power-up of the microcontroller 116, or as outputs where they are driven by the microcontroller 116 to logic level output low states (e.g., 0V) or logic level output high states (e.g., 3.3V), as is readily understood by those of ordinary skill in the art. An example of a suitable microcontroller 116 is the Microchip FJ32GA004 microcontroller.

The timing circuit 102 is coupled to the first pin 110 of the microcontroller 116. The timing circuit 102 and the microcontroller 116 are powered by a conventional regulated power supply that produces, via a regulator circuit, a regulated direct current (DC) voltage, $V_{DD}$, derived from the alternating current (AC) line voltage, which can be rectified by a conventional half- or full-wave bridge rectifier (not shown). $V_{DD}$ is typically about 3.3V.

The first pin 110 is coupled through a resistor $R_{112}$ to a node 118 between a resistor $R_{113}$ and a capacitor $C_{64}$, which is grounded to the regulated power supply. Two diodes, $D_1$ and $D_2$, are connected between the resistor $R_{113}$ and a base of a bipolar junction transistor $Q_8$. The emitter junction of the transistor $Q_8$ is connected to a gate of the electronic switching device 104, which in the illustration is a silicon controlled rectifier (SCR). The collector of the transistor $Q_8$ is coupled to the regulated power supply voltage through a resistor $R_{114}$. As used herein, the terms "base" and "gate" are not intended to denote any particular transistor and are used interchangeably to refer to any input switching terminal of a transistor. The base of the transistor $Q_8$ is coupled to the resistor $R_{113}$ at the node 118 through two series-connected diodes $D_1$ and $D_2$. The combination of the voltage drop across the emitter and the two diodes $D_1$ and $D_2$ sets a minimum threshold voltage (approximately 2.1V assuming a diode drop of 0.7V across each of the three diodes) that the node 118 before a leakage current begins to flow through diodes $D_1$ and $D_2$. When a sufficient amount of leakage current reaches the base of the transistor $Q_8$, the transistor $Q_8$ turns on, which in turn dumps current into the gate of the SCR 104, turning it on as well. The activation of the SCR 104 causes the circuit breaker 100 to trip.

When the circuit breaker 100 is connected to a live circuit and powered on, such as by urging the movable contacts 108 to the on position such that they make electrical contact with one another, the microcontroller 116 initiates its internal diagnostics and startup routines. The first and second pins 110, 112, respectively, are initially in a high impedance state, and if the microcontroller 116 successfully completes its diagnostic and startup routines, the microcontroller 116 drives the first pin 110 to a low logic level state (e.g., 0V), shorting out the capacitor $C_{64}$ and preventing the node 118 from exceeding the turn-on threshold voltage for the base of the transistor $Q_8$. During normal operation, if the microcontroller 116 detects an electrical fault on the circuit to which the circuit breaker 100 is connected, the microcontroller 116 drives the second pin 112 to a high voltage level (e.g., a logic level high of 3.3V) sufficient to cause the SCR 104 to turn on. The second pin 112 is sometimes referred to as a trip output, because it is the output signal by which a trip is initiated by the microcontroller 116.

However, if the microcontroller 116 does not successfully complete its diagnostic and startup routines due to a fault in the microcontroller 116, or the microcontroller 116 is otherwise initially unresponsive, the second pin 112 will remain in a high-impedance input state and the SCR 104 will not be activated by the microcontroller 116, leaving the load being protected by the circuit breaker 100 vulnerable. Therefore, as further explained herein, the timing circuit 102 can bypass the microcontroller 116 and provide a mechanism for tripping the SCR 104 in the event that the microcontroller 116 is unresponsive at startup.

Those of ordinary skill in the art will appreciate that the specific components shown in FIG. 1 are exemplary only, and certain components can be eliminated or replaced with other components or that additional components can be added without deviating from the spirit and scope of this disclosure. For example, in other implementations, only one diode $D_1$ or $D_2$ is provided between the base of the transistor $Q_8$ and the node 118. The transistor $Q_8$ can be a field effect transistor (FET) instead of a BJT transistor as illustrated. The electronic switching transistor 104 can be an SCR as disclosed above or an FET transistor or a thyristor. The electronic switching transistor 104 can be line-powered or powered by the line-voltage derived power supply. By "line-powered," it is understood that a component need not be directly powered from line current to which the circuit breaker is connected (this is sometimes referred to as "fault" powered), but rather can be powered from a rectified representation of the line voltage. Those of ordinary skill in the art will readily appreciate that a rectifier, such as a diode 208 shown in FIG. 2 or a full-wave bridge rectifier 308 shown in FIG. 3, can be connected to the line input of the circuit breaker to supply a rectified signal to the electronic components in the circuit breaker, and this configuration is considered to be a "line-powered" configuration. By contrast, a regulated power supply typically includes a voltage regulator circuit for providing a regulated DC voltage output and a ground reference that is at least a diode drop away from the potential of the neutral input to the circuit breaker. The terms "line powered" and "powered by a power supply" are distinct.

In FIG. 1, the timing circuit 102 is powered by a regulated power supply, so if the regulated power supply fails, the timing circuit 102 will not work. The timing circuit 102 in FIG. 1 activates the SCR only if the microcontroller is unresponsive. In FIGS. 2 and 3, alternative embodiments are proposed in which a circuit breaker includes a line-powered timing circuit that activates an SCR when either a power supply failure occurs or the microcontroller is unresponsive. These embodiments shall be discussed next.

In FIG. 2, a circuit breaker 200 includes the following circuits connected in parallel to one another: a line-powered timing circuit 202, a fault detection circuit 206, an electronic switching device 204, and an optional protection diode 220. A rectifier 208 rectifies the alternating current (AC) from a line input to the circuit breaker 200, and a drop resistor $R_D$ reduces the line voltage for the regulated power supply 214. The fault detection circuit 206 includes a regulated power supply 214 that produces a regulated DC voltage derived from the AC line input to which the circuit breaker 200 is connected. The regulated power supply 214 powers a microcontroller 216 that detects one or more fault conditions on a circuit being protected by the circuit breaker 200 to which the circuit is connected. The microcontroller 216 includes a pin 212 that is configurable as a high-impedance input or as an output. This pin 212 is connected to a node 218 in the timing circuit 202, which is connected to a gate of the electronic switching device 204, which in the illustrated example is an SCR conventionally having a gate, an anode, and a cathode. The pin 212 corresponds to a trip output of the microcontroller 216, which pulls the input pin 212 to a logic level high output state in response to the microcontroller 216 being programmed to instruct the SCR 204 to turn on and thereby cause the circuit breaker 200 to trip.

The timing circuit 202 includes a resistor $R_A$ connected between the gate and the anode of the SCR 204, and a capacitor $C_A$ connected between the gate and the cathode of the SCR 204 as illustrated in FIG. 2. When the pin 212 is in its normally high-impedance input state, the voltage across the capacitor $C_A$ in the timing circuit 202 builds up and eventually exceeds a turn-on voltage for the gate of the SCR 204, turning the SCR 204 on, which causes a trip solenoid 210 of the circuit breaker 200 to trip a movable contact of the circuit breaker 200 and break the electrical connection of the circuit breaker 200 to the circuit to which it is connected. Thus, if the microcontroller 216 fails due to a fault in the microcontroller 216 or a fault in the regulated power supply 214, the pin 212 will remain in a high-impedance input state, allowing the voltage across the capacitor $C_A$ to increase until the turn-on voltage threshold of the gate of the SCR is exceeded. It is important to note that the satisfaction of either of the two conditions—a microcontroller 216 fault or a power supply 214 fault—or both will cause the pin 212 to remain in a high-impedance state. In this manner, the timing circuit 202 is responsive to a failure or fault of the regulated power supply 214 or the microcontroller 216 or both and can turn on the SCR 204.

If the regulated power supply 214 operates normally and powers the microcontroller 216 and the microcontroller 216 successfully completes its diagnostic and startup routines, the microcontroller 216 will pull the pin 212 to a logic low output state, shorting out the capacitor $C_A$, which prevents the gate of the SCR 204 from achieving a sufficient potential to cause the SCR 204 to begin conducting, and the SCR 204 remains off. If the microcontroller 216 detects a fault, the microcontroller 216 pulls the pin 212 to a logical high output state, which has a voltage that exceeds the turn-on voltage of the gate of the SCR 204, causing the SCR 204 to conduct and thereby trip the circuit breaker 200.

FIG. 3 is similar to FIG. 2, except that a full-wave bridge rectifier 308 is used instead of the rectifying diode 208 shown in FIG. 2, and the drop resistor, $R_D$, is placed downstream of a timing circuit 302 instead of upstream of the timing circuit 202 as shown in FIG. 2. It is preferable to place the drop resistor $R_D$ downstream of the timing circuit 302 as illustrated in FIG. 3 to ensure that the timing circuit 302 will cause the SCR 304 to conduct as quickly as possible if the regulated power supply 314 or the microcontroller 316 is or becomes unresponsive due to a fault or failure and to ensure that the timing circuit 302 will operate if the drop resistor $R_D$ fails.

In FIG. 3, a circuit breaker 300 includes the following circuits connected in parallel to one another: a line-powered timing circuit 302, a fault detection circuit 306, and an electronic switching device 304. The full-wave bridge rectifier 308 fully rectifies the alternating current (AC) from a line input to the circuit breaker 300, and the drop resistor $R_D$, which is placed downstream of the timing circuit 302, reduces the line voltage for a regulated power supply 314. The fault detection circuit 306 includes the regulated power supply 314 that produces a regulated DC voltage derived from the AC line input to which the circuit breaker 300 is connected. The regulated power supply 314 powers a microcontroller 316 that detects one or more fault conditions on a circuit being protected by the circuit breaker 300 to which the circuit is connected. The microcontroller 316 includes a pin 312 that is configurable as a high-impedance input or as an output. This pin 312 is connected through the resistor R4 to a node 318 in the timing circuit 302, which is connected to a gate of the electronic switching device 304, which in the illustrated example is an SCR conventionally having a gate, an anode, and a cathode. The pin 312 corresponds to a trip output of the microcontroller 316, which pulls the input pin 312 to a logic level high output state in response to the microcontroller 316 being programmed to instruct the SCR 304 to turn on and thereby cause the circuit breaker 300 to trip. An example of a suitable microcontroller 316 is the MC68HC908QT2/4 available from Freescale, Inc.

The timing circuit 302 includes a resistor $R_1$ connected between the gate and the anode of the SCR 304, and a capacitor $C_1$ connected between the gate and the cathode of the SCR 304 as illustrated in FIG. 3. When the pin 312 is in its normally high-impedance input state, the voltage across the capacitor $C_1$ in the timing circuit 302 builds up and eventually exceeds a turn-on voltage for the gate of the SCR 304, turning the SCR 304 on, which causes a trip solenoid 310 of the circuit breaker 300 to trip a movable contact of the circuit breaker 300 and break the electrical connection of the circuit breaker 300 to the circuit to which it is connected. Thus, if the microcontroller 316 fails due to a fault in the microcontroller 316 or a fault in the regulated power supply 314, the pin 316 will remain in a high-impedance input state, allowing the voltage across the capacitor $C_1$ to increase until the turn-on voltage threshold of the gate of the SCR 304 is exceeded. It is important to note that the satisfaction of either of the two conditions—a microcontroller 316 fault or a power supply 314 fault—or both will cause the pin 316 to remain in a high-impedance state. In this manner, the timing circuit 302 is responsive to a failure or fault of the regulated power supply 314 or the microcontroller 316 or both and can turn on the SCR 304.

If the regulated power supply 314 operates normally and powers the microcontroller 316, and the microcontroller 316 successfully completes its diagnostic and startup routines, the microcontroller 316 will pull the pin 312 to a logic low output state, shorting out the capacitor $C_1$, which prevents the gate of the SCR 304 from achieving a sufficient potential to cause the SCR 304 to begin conducting, and the SCR 304 remains off. If the microcontroller 316 detects a fault, the microcontroller 316 pulls the pin 312 to a logical high output state, which has a voltage that exceeds the turn-on voltage of the gate of the SCR 304, causing the SCR 304 to conduct and thereby trip the circuit breaker 300.

Without limiting the scope of the present disclosure, the following Table 1 lists exemplary values for the components shown in FIG. 3:

| Component | Exemplary Value |
| --- | --- |
| C | 0.01 uF (500 V) |
| $R_1$ | 500 KΩ |
| $C_1$ | 0.1 uF |
| $R_4$ | 1 kΩ |
| $R_{D1}, R_{D2}$ | 11 kΩ |

It should be understood that the electronic circuits disclosed herein can be disposed on one or more printed circuit boards (PCBs). The circuit breakers disclosed herein can be any microcontroller-based circuit breakers, including ground fault interrupter (GFI) circuit breakers, such as those based on the QO120GFI circuit breaker available from Square D Company, arc fault interrupter (AFI) circuit breakers, such as those based on the QO120AFI circuit breaker available from Square D Company, or any other industrial or residential circuit breaker that includes a microcontroller for detecting a fault condition on the circuit being protected. Although the electronic switching devices 104, 204, 304 are illustrated in the Figures as being SCRs, those of ordinary skill in the art will appreciate that other switching devices can be employed instead, such as an FET or a thyristor. The term "timing circuit" is also variously referred to as a "backup circuit" in that it is operable to trip the circuit breaker when the microcontroller is initially unresponsive or the regulated power supply is or becomes unresponsive. As mentioned above, the terms "gate" and "base" when used in conjunction with a transistor are interchangeable and are not intended to apply to any particular transistor. Rather, both terms refer to the control switch terminal of a transistor.

While particular aspects, embodiments, and applications of the present disclosure have been illustrated and described, it is to be understood that the disclosure is not limited to the precise construction and compositions disclosed herein and that various modifications, changes, and variations may be apparent from the foregoing descriptions without departing from the spirit and scope of the disclosure as defined in the appended claims.

What invention claimed is:

1. A backup circuit in a circuit breaker capable of microcontroller-based fault detection, the backup circuit tripping the circuit breaker in response to the microcontroller being unresponsive, comprising:
    a power supply that produces a regulated direct current (DC) voltage derived from an alternating current (AC) line input to which the circuit breaker is connected;
    a timing circuit powered by the power supply and electrically coupled to an electronic switching device that causes the circuit breaker to trip in response to the electronic switching device being turned on; and
    a microcontroller having a first pin coupled to the timing circuit and a second pin coupled to the electronic switching device, wherein the first pin is configurable as a high-impedance input or as an output,
    wherein the first pin is coupled to a node between a resistor and a grounded capacitor in the timing circuit, the node being coupled to a gate of the electronic switching device, and wherein a voltage develops at the node sufficient to cause the gate of the electronic switching device to turn on unless the microcontroller pulls the first pin to a logic low output state.

2. The backup circuit of claim 1, wherein the timing circuit further comprises a transistor coupled to the gate of the electronic switching device, wherein a base of the transistor is coupled to the node between the resistor and the grounded capacitor.

3. The backup circuit of claim 2, wherein the timing circuit further comprises at least one diode connected between the base of the transistor and the resistor, which provides an additional voltage drop that the node must overcome to cause the transistor to turn on.

4. The backup circuit of claim 3, wherein the transistor is a bipolar junction transistor powered by the power supply.

5. The backup circuit of claim 3, wherein the at least one diode is exactly two diodes connected in series between the base of the transistor and the resistor, which together provide an additional voltage drop that the node must overcome to cause the transistor to turn on.

6. The backup circuit of claim 1, wherein the electronic switching device is line-powered.

7. The backup circuit of claim 1, wherein the electronic switching device is a silicon controlled rectifier (SCR).

8. The backup circuit of claim 1, wherein the electronic switching device is a field effect transistor (FET).

9. The backup circuit of claim 1, wherein the microcontroller is programmed to produce a voltage on the second pin to cause the electronic switching device to turn on in response to the microcontroller detecting an electrical fault on a circuit to which the circuit breaker is connected.

10. The backup circuit of claim 1, wherein the first pin is configured as the high-impedance input at power-up of the microcontroller, and wherein the first pin is configured as the output in the logic low output state.

11. A circuit breaker capable of microcontroller-based fault detection having a backup circuit for causing the circuit breaker to trip in response to the microcontroller being unresponsive, comprising:
    a power supply that produces a regulated direct current (DC) voltage derived from an alternating current (AC) line voltage to which the circuit breaker is connected;
    a timing circuit powered by the power supply and electrically coupled to a line-powered electronic switching device that causes the circuit breaker to trip in response to the electronic switching device being turned on, the timing circuit including a transistor coupled to the gate of the electronic switching device; and
    a microcontroller having a first pin coupled to the timing circuit and a second pin coupled to the electronic switching device, wherein the first pin is at power-up a high-impedance input,
    wherein the first pin is coupled to a node between a resistor and a grounded capacitor in the timing circuit, the node being coupled to a gate of the electronic switching device,
    wherein a voltage develops at the node sufficient to cause the gate of the electronic switching device to turn on unless the microcontroller pulls the first pin to a logic low output state, and
    wherein a base of the transistor is coupled to the node.

12. The circuit breaker of claim 11, wherein the timing circuit further comprises at least one diode connected between the gate of the transistor and the resistor, which provides an additional voltage drop that the node must overcome to cause the transistor to turn on.

13. The circuit breaker of claim 12, wherein the transistor is a bipolar junction transistor powered by the power supply.

14. The circuit breaker of claim 12, wherein the at least one diode is exactly two diodes connected in series between the gate of the transistor and the resistor, which together provide an additional voltage drop that the node must overcome to cause the transistor to turn on.

15. The circuit breaker of claim 11, wherein the electronic switching device is a silicon controlled rectifier (SCR) or a field effect transistor (FET).

16. The circuit breaker of claim 11, wherein the microcontroller is programmed to produce a voltage on the second pin to cause the electronic switching device to turn on in response to the microcontroller detecting an electrical fault on a circuit to which the circuit breaker is connected.

17. The circuit breaker of claim 11, wherein the first pin is configured as an output in the logic low output state.

* * * * *